(12) United States Patent
Ho et al.

(10) Patent No.: US 12,008,906 B2
(45) Date of Patent: Jun. 11, 2024

(54) METHOD AND SYSTEM OF BLIND SPOT DETECTION FOR A VEHICLE

(71) Applicant: INDUSTRIAL TECHNOLOGY RESEARCH INSTITUTE, Hsinchu (TW)

(72) Inventors: Chung-Lien Ho, Zhubei (TW); Wei-Kuo Chen, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 17/556,281

(22) Filed: Dec. 20, 2021

(65) Prior Publication Data

US 2022/0284816 A1 Sep. 8, 2022

Related U.S. Application Data

(60) Provisional application No. 63/156,398, filed on Mar. 4, 2021.

(30) Foreign Application Priority Data

Oct. 29, 2021 (TW) .................... 110140450

(51) Int. Cl.
  *G08G 1/16* (2006.01)
  *B60Q 9/00* (2006.01)
  *G07C 5/08* (2006.01)

(52) U.S. Cl.
  CPC ............ *G08G 1/167* (2013.01); *B60Q 9/008* (2013.01); *G07C 5/0808* (2013.01)

(58) Field of Classification Search
  None
  See application file for complete search history.

(56) References Cited

U.S. PATENT DOCUMENTS 9,211,889 B1   12/2015   Hoetzer et al.
9,373,044 B2   6/2016    Wallat et al.
(Continued)

FOREIGN PATENT DOCUMENTS

CN    105501114 A    4/2016
CN    106043126 A    10/2016
(Continued)

OTHER PUBLICATIONS

Extended European Search Report for European Application No. 22151317.9, dated Jul. 5, 2022.
(Continued)

*Primary Examiner* — Muhammad Adnan
(74) *Attorney, Agent, or Firm* — Birch, Stewart, Kolasch & Birch, LLP

(57) ABSTRACT

A method of blind spot detection is provided. The method of blind spot detection is used for a vehicle including a first vehicle body and a second vehicle body dragged by the first vehicle body. The method of blind spot detection comprises the following steps: obtaining a turning angle information of the second vehicle body relative to the first vehicle body by a first sensor while the vehicle is moving; determining a predetermined information related to the vehicle and/or a second sensor; dynamically defining a blind spot area around the vehicle according to the turning angle information and the predetermined information; and receiving a sensing signal regarding an object around the vehicle from the second sensor to determine whether the object is located in the blind spot area.

16 Claims, 9 Drawing Sheets

(56) References Cited

U.S. PATENT DOCUMENTS

| | | | |
|---|---|---|---|
| 9,527,528 B1* | 12/2016 | Harrison | B62D 13/00 |
| 10,286,916 B2 | 5/2019 | Prasad et al. | |
| 2010/0039721 A1* | 2/2010 | Lee | B60R 1/025 |
| | | | 359/843 |
| 2014/0160276 A1* | 6/2014 | Pliefke | B62D 13/06 |
| | | | 348/118 |
| 2017/0050672 A1* | 2/2017 | Gieseke | B62D 15/0295 |
| 2018/0197417 A1* | 7/2018 | Burtch | B60R 1/0612 |
| 2019/0129429 A1 | 5/2019 | Juelsgaard et al. | |
| 2019/0130759 A1* | 5/2019 | Lesher | G08G 1/167 |
| 2019/0210418 A1* | 7/2019 | Hall | B60D 1/245 |
| 2019/0325233 A1* | 10/2019 | Broll | B60R 1/00 |
| 2019/0378282 A1* | 12/2019 | Rogan | G06T 7/251 |
| 2020/0324763 A1* | 10/2020 | Switkes | G08G 1/161 |
| 2020/0372802 A1* | 11/2020 | Kim | G01S 15/931 |
| 2021/0233407 A1* | 7/2021 | Schondorf | B60R 11/04 |
| 2022/0258766 A1* | 8/2022 | Nageswaran | B60W 60/001 |

FOREIGN PATENT DOCUMENTS

| | | | | |
|---|---|---|---|---|
| CN | 107092870 A | | 8/2017 | |
| CN | 110303983 A | | 10/2019 | |
| CN | 210707139 U | | 6/2020 | |
| CN | 111976598 A | | 11/2020 | |
| DE | 10 2010 032 411 A1 | | 2/2012 | |
| DE | 10 2011 116 822 A1 | | 4/2013 | |
| DE | 10 2014 110 642 A1 | | 2/2016 | |
| DE | 102014110642 A1 | * | 2/2016 | ............ B60R 1/00 |
| DE | 10 2016 015 363 A1 | | 6/2018 | |
| TW | 201914862 A | | 4/2019 | |
| TW | M576981 U | | 4/2019 | |
| TW | I674424 B | | 10/2019 | |
| TW | M593949 U | | 4/2020 | |
| TW | M595068 U | | 5/2020 | |
| WO | WO-2022192267 A1 | * | 9/2022 | ............ B60D 1/64 |

OTHER PUBLICATIONS

Taiwanese Office Action and Search Report for Taiwanese Application No. 110140450, dated Jul. 4, 2022.

Bagi et al., "Sensing Structure for Blind Spot Detection System in Vehicles", 2019 International Conference on Control, Automation and Information Sciences (ICCAIS), IEEE, 2019, total 6 pages.

Ju et al., "Development and Performance Evaluation of Integrated Automotive Mid-Range Radar System based on ROI preprocessing technique", 2019 International Radar Conference (RADAR2019), IEEE, 2019, total 5 pages.

Klotz et al., "24 GHz Radar Sensors for Automotive Applications", Journal of Telecommunications and Information Technology, Apr. 2001, pp. 359-362.

Liu et al., "A Radar-based Blind Spot Detection and Warning System for Driver Assistance", IEEE, 2017, pp. 2204-2208.

Meinecke et al., "Experiences with a Radar-Based Side Assist for Heavy Vehicles", Authorized licensed use limited to: Industrial Technology Research Institute. Downloaded on Feb. 23, 2021 at 01:35:00 UTC from IEEE Xplore, total 6 pages.

Racine et al., "Active Blind Spot Crash Avoidance System A Haptic Solution to Blind Spot Collisions", IEEE, 2010, total 5 pages.

* cited by examiner

US 12,008,906 B2

METHOD AND SYSTEM OF BLIND SPOT DETECTION FOR A VEHICLE

This application claims the benefit of U.S. provisional application Ser. No. 63/156,398, filed on Mar. 4, 2021 and Taiwan application Serial No. 110140450, filed Oct. 29, 2021, the subject matter of which are incorporated herein by reference.

BACKGROUND OF THE INVENTION

Field of the Invention

The present application relates in general to a method and system of blind spot detection for a vehicle.

Description of the Related Art

In a general semi-trailer truck, there is a turning angle formed between a trailer and a tractor truck when the semi-trailer truck turns. The factor of this turning angle will significantly affect the blind spot detection performance of radars for trucks. Therefore, to propose an improved method and system of blind spot detection with a better performance is one of the goals that those skilled in the art strive to achieve.

SUMMARY OF THE INVENTION

According to an aspect of the present disclosure, a method of blind spot detection is provided. The method of blind spot detection is used for a vehicle including a first vehicle body and a second vehicle body dragged by the first vehicle body. The method of blind spot detection comprises the following steps: obtaining a turning angle information of the second vehicle body relative to the first vehicle body by a first sensor while the vehicle is moving; determining a predetermined information related to the vehicle and/or a second sensor; dynamically defining a blind spot area around the vehicle according to the turning angle information and the predetermined information; and receiving a sensing signal regarding an object around the vehicle from the second sensor to determine whether the object is located in the blind spot area.

According to another aspect of the present disclosure, a system of blind spot detection is provided. The system of blind spot detection is used for a vehicle including a first vehicle body and a second vehicle body dragged by the first vehicle body. The system of blind spot detection comprises a first sensor, a second sensor and a processor. The first sensor is configured to obtain a turning angle information of the second vehicle body relative to the first vehicle body while the vehicle is moving. The second sensor is configured to sense an object approaching the vehicle. The processor communicates with the first sensor and the second sensor and is configured to determine a predetermined information related to the vehicle and/or a second sensor. Further, the processor is configured to dynamically define a blind spot area around the vehicle according to the turning angle information and the predetermined information and to receive a sensing signal regarding the object from the second sensor to determine whether the object is located in the blind spot area.

The above and other embodiments of the disclosure will become better understood with regard to the following detailed description of the non-limiting embodiment(s). The following description is made with reference to the accompanying drawings.

DETAILED DESCRIPTION OF THE INVENTION

Figure 1:
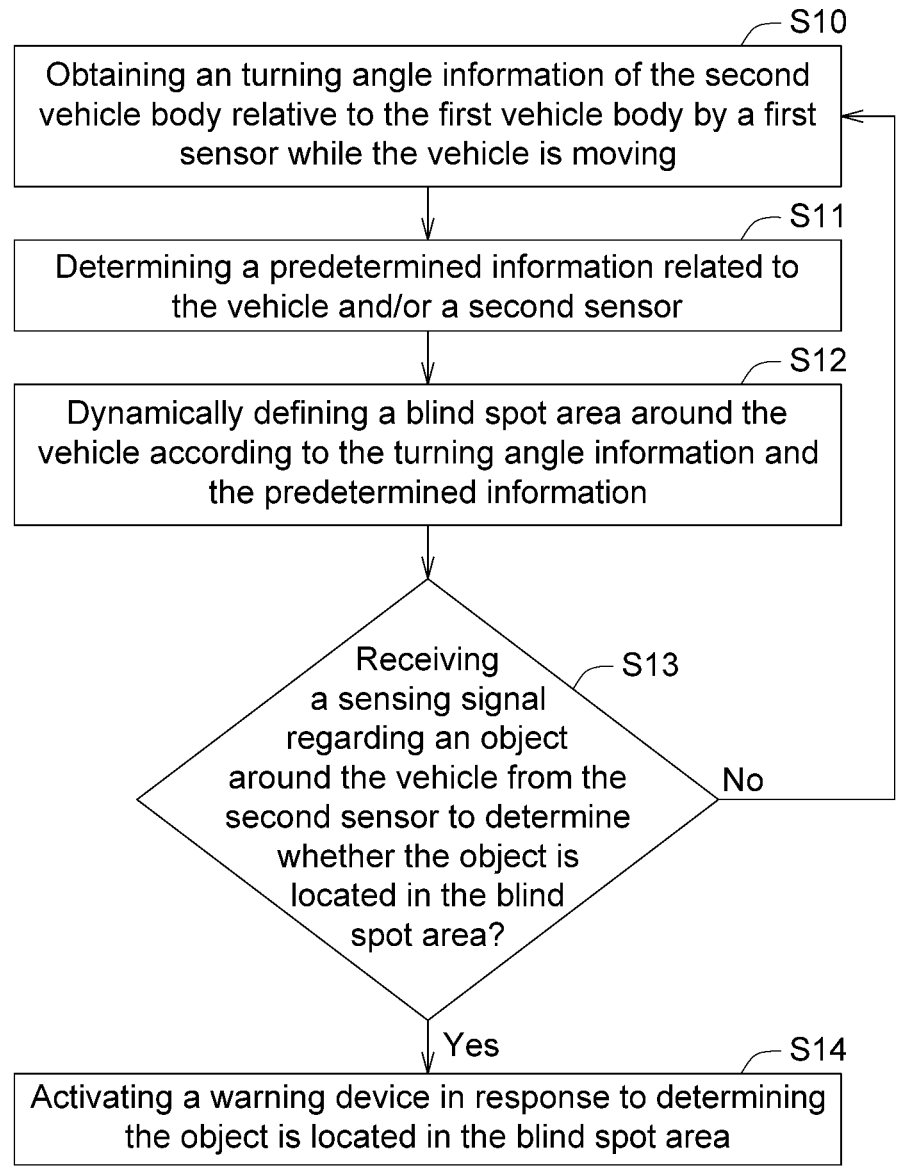
FIG. 1 is a flow chart of a method of blind spot detection according to an embodiment of the present application.
Figure 2:
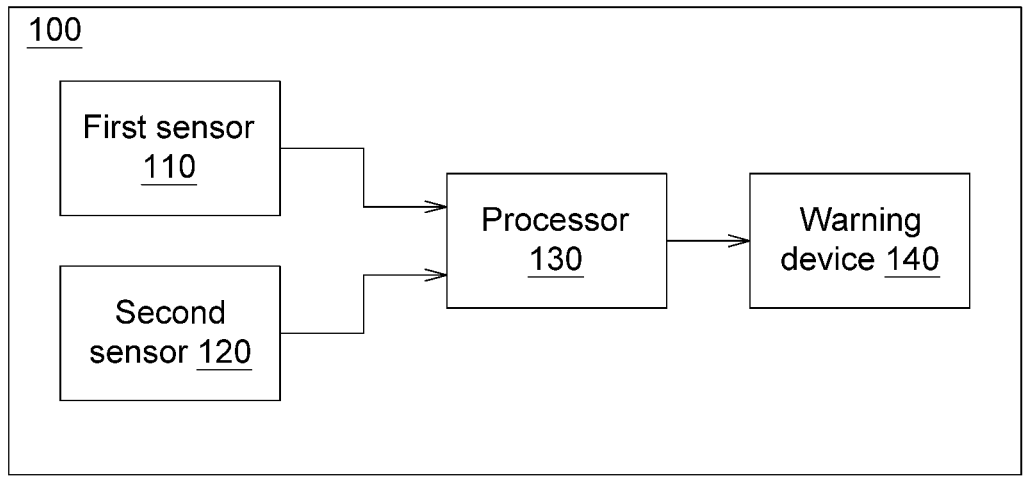
FIG. 2 is a block diagram of a system of blind spot detection according to an embodiment of the present application.
Figure 3:
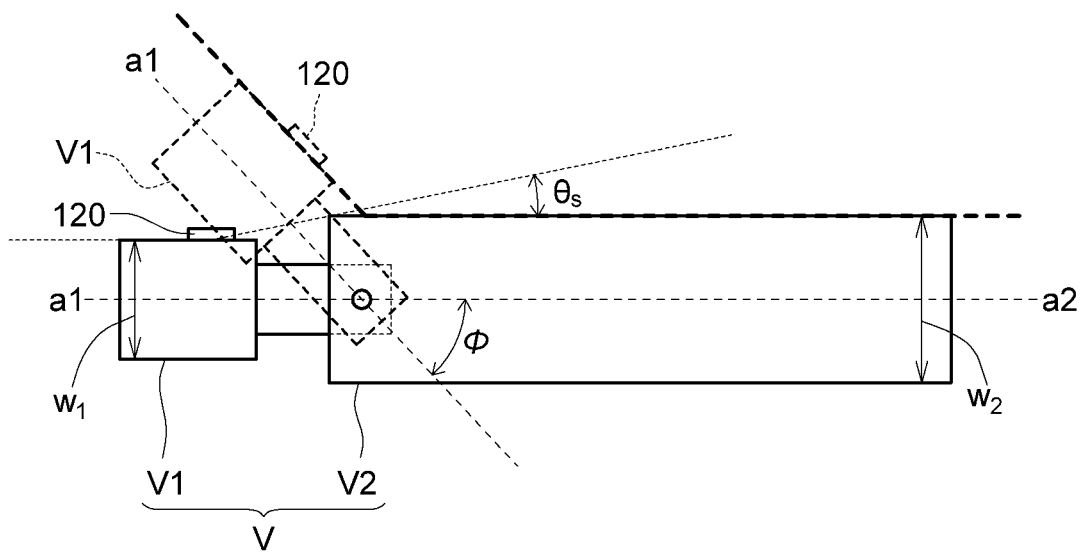
FIG. 3 shows that the method and system of blind spot detection of the present application are applied to a vehicle in top view.

FIG. 1 shows a flow chart of a method S of blind spot detection according to an embodiment of the present application. FIG. 2 shows a block diagram of a system 100 of blind spot detection according to an embodiment of the present application. FIG. 3 shows that the method S of blind spot detection is applied to a vehicle V in top view.

The vehicle V includes a first vehicle body V1 and a second vehicle body V2. The vehicle V can be realized by a semi-trailer truck, the first vehicle body V1 can be correspondingly realized by a tractor truck, and the second vehicle body V2 can be correspondingly realized by a trailer. The second vehicle body V2 may be dragged by the first vehicle body. Specifically, the first vehicle body V1 may connect with the second vehicle body V2 via the so-called fifth wheel coupling.

Since the so-called fifth wheel coupling would cause a turning angle difference to form between the tractor truck and the trailer when the semi-trailer truck turns, such that there is a blind area to a driver while the semi-trailer truck is moving. Thus, a sensor (ex. a radar sensor) is installed on the vehicle V generally to sense any object approaching the vehicle V. While a semi-trailer truck such as vehicle V is turning, the radar sensor may receive (a) direct reflections from the object(s) around the vehicle V, and (b) indirect reflections of the object(s) from the wall of the trailer such as the second vehicle body V2, or (c) direct reflections from the structure of the second vehicle body V2. The reflections of types (b) and (c) are not reflection of interest and they will interfere with the detection result. Thus, the method S and the system 100 of blind spot detection of the present disclosure are intended to dynamically define a blind spot area to regard the reflections of types (b) and (c) as not reflection of interest, so as to filter out the signal that will interfere with the detection result. As such, the detection result of the blind spot detection will be more precise and reliable.

Please refer to FIG. 1 to FIG. 3, which show the configuration of the system 100 of blind spot detection and the steps S10 to S13 of the method S of blind spot detection. The system 100 of blind spot detection comprises a first sensor 110, a second sensor 120 and a processor 130. The processor 130 communicates with the first sensor 110 and the second sensor 120. In the step S10, the first sensor 110 is such as but not limited to an angle sensor built in the vehicle V, and the first sensor 110 is configured to obtain a turning angle information of the second vehicle body V2 relative to the first vehicle body V1 while the vehicle V is moving. The turning angle information is correspondingly the information about an angle (turning angle Φ in FIG. 3) between a longitudinal axis a1 of the first vehicle body V1 and a longitudinal axis a2 of the second vehicle body V2. The turning angle Φ may be changed as the vehicle V turns, and so the turning angle Φ is a dynamic information. The first sensor 110 communicates with the processor 130 to transfer the turning angle information to the processor 130 in real time. The turning angle information is an important factor for defining the blind spot area.

Then in the step S11, the processor 130 determines a predetermined information related to the vehicle V and/or a second sensor 120, wherein the second sensor 120 may be installed on the vehicle V and sense any object approaching the vehicle, and the second sensor 120 is such as but not limited to a radar sensor. In an embodiment, the predetermined information related to the vehicle V and/or the second sensor 120 may include a sensing performance information about the second sensor 120. For example, the sensing performance information is a maximum detectable field-of-view of the second sensor 120, and the maximum detectable field-of-view of the second sensor 120 is generally set to be a semi-circular sensing range of 180 degrees. However, the maximum detectable field-of-view of the second sensor 120 may also be set to be other values according to actual usage condition. In another embodiment, the predetermined information related to the vehicle V and/or the second sensor 120 may include a dimension information about the first vehicle body V1 and the second vehicle body V2. For example, the dimension information is about a length or width of the first vehicle body V1 and a length or width of the second vehicle body V2. In another embodiment, the predetermined information related to the vehicle V and/or the second sensor 120 may include a location information about where the second sensor 120 is installed on the vehicle V. For example, the location information is a location (such as a coordinate) where the second sensor 120 is installed on the first vehicle body V1. In another embodiment, the predetermined information related to the vehicle V and/or the second sensor 120 may include all the sensing performance information about the second sensor 120, the dimension information about the first vehicle body V1 and the second vehicle body V2 and the location information about where the second sensor 120 is installed on the vehicle V, so as to more precisely define the blind spot area while the vehicle V is moving.

In other words, in the step S11, the processor 130 determines the predetermined information related to the vehicle V and/or the second sensor 120 which is static and can be input to the processor 130 in advance, and the predetermined information does not need to be adjusted after being input to the processor 130. The predetermined information is also an important factor for defining the blind spot area. Further, in another embodiment, the processor 130 determines that the width $W_1$ of the first vehicle body V1 is less than the width $W_2$ of the second vehicle body V2, the processor 130 further determines a shading angle information, and the processor 130 dynamically defines the blind spot area according to aforementioned the turning angle information, the dimension information, the location information, the sensing performance information and this shading angle information. This so-called shading angle information is formed by the second vehicle body V2 shielding the second sensor 120 that is installed on the first vehicle body V1, thereby causing the maximum detectable field-of-view of the second sensor 120 to be affected. The shading angle information is correspondingly the shading angle $θ_s$ as shown in FIG. 3.

Then in the step S12, the processor 130 dynamically defines a blind spot area around the vehicle V according to the turning angle information from the first sensor 110 and the predetermined information determined by the processor 130 itself. As described above, the second sensor 120 is easy to receive unexpected reflections that will interfere with the detection result. In view of that, the processor 130 in the step S12 refers both the dynamic turning angle information and the static predetermined information to define a variable blind spot area, so as to filter out the reflections which are sensed outside the variable blind spot area, thereby eliminating unexpected reflections that will interfere with the detection result.

Then in the step S13, the processor 130 receives a sensing signal regarding an object from the second sensor 120 to determine whether the object is located in the blind spot area. Specifically, the processor 130 determines whether the object is located in the variable blind spot area according to a location signal (such as a coordinate) of the object around the vehicle V received from the second sensor 120. As such, the blind spot detection is completed.

After completing the blind spot detection, a warning step represented by the step S14 can be performed if the processor 130 determines that an object exists in the defined blind spot area. In the step S14, the processor 130 activates a warning device 140 to issue a warning signal to the driver of the vehicle V in response to that the processor 130 determines that the object is located in the blind spot area, thereby preventing car accidents. Conversely, if the processor 130 determines that no object exists in the defined blind spot area, then back to the step S10 of obtaining the turning angle information of the second vehicle body V2 relative to the first vehicle body V1 while the vehicle V is moving. In an embodiment, the warning device 140 may be a device providing a warning sound or light that is installed on the vehicle V in advance. Alternatively, in another embodiment, the warning device 140 may also be a device that is not installed on the vehicle V, for example, an electronic device communicating with the processor 130 (such as a smart phone, a tablet computer, a smart wearable device or a wireless headset) or a road safety warning device or infrastructure communicating with the processor 130 (such as V2I), so as to issue a warning signal to the driver by remote notification.

Figure 4A:
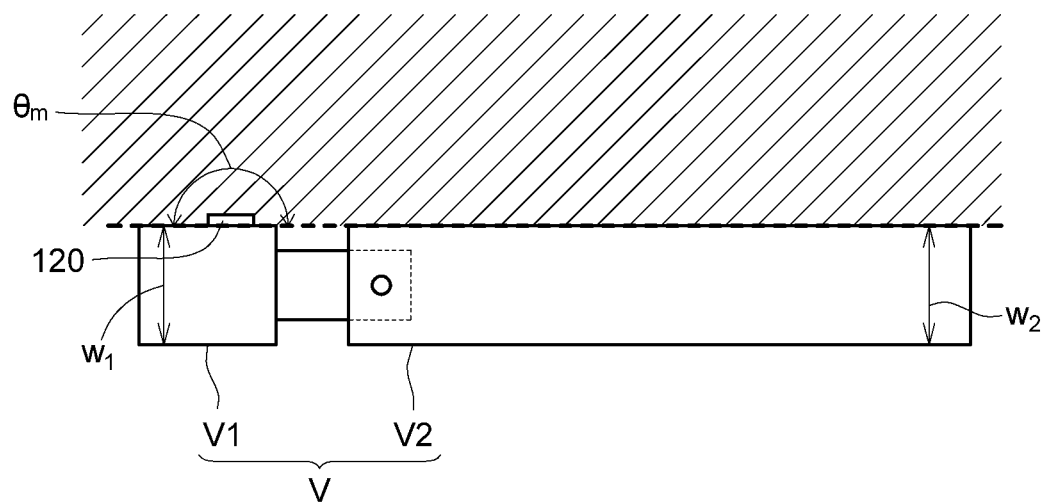
FIGS. 4A to 4B show a situation that the method and system of blind spot detection of the present application are applied to a vehicle.
Figure 4B:
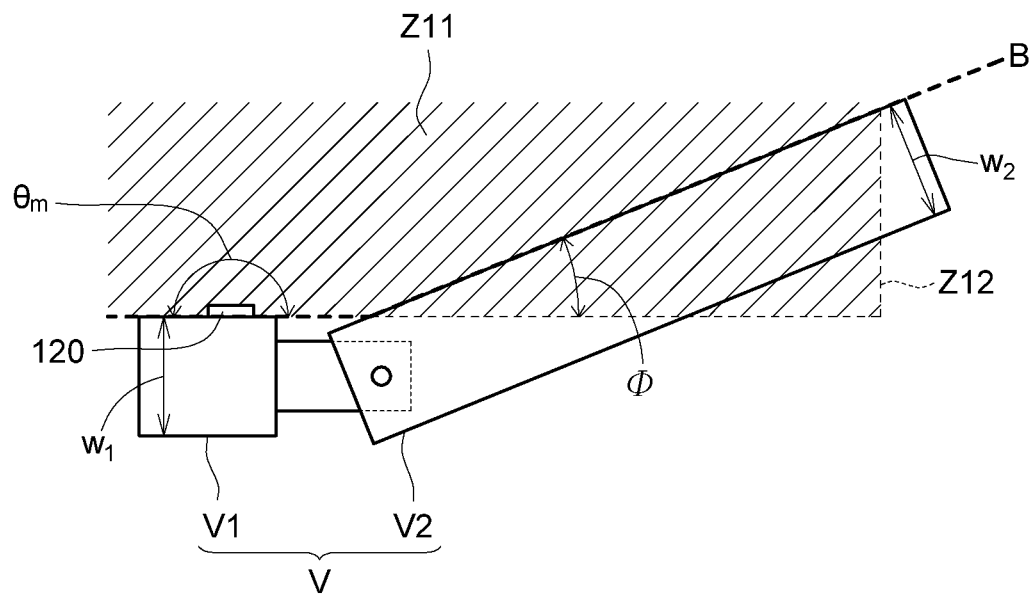
Figure 5A:
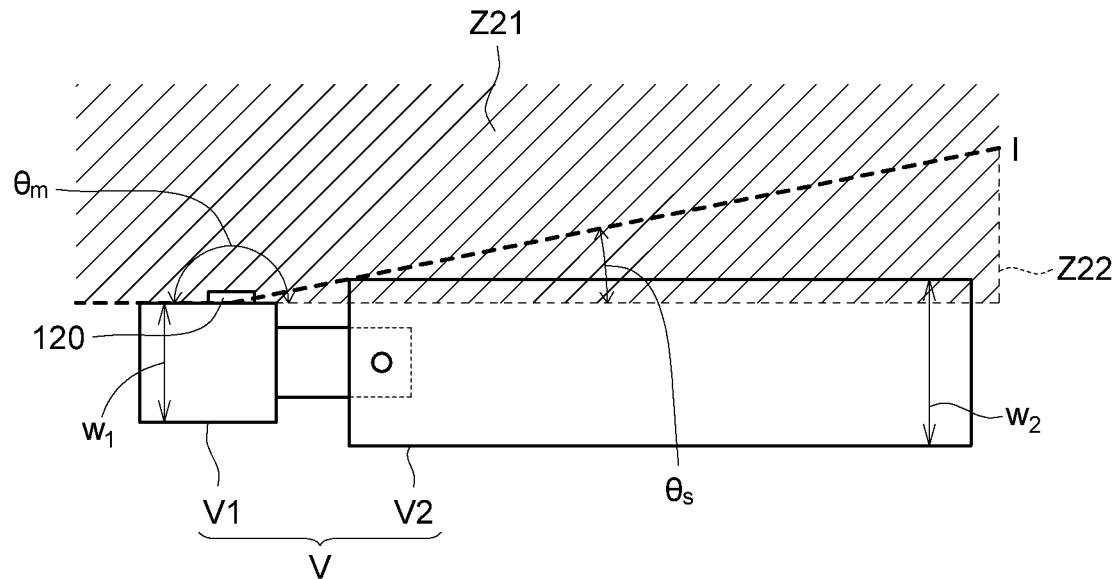
FIGS. 5A to 5C show another situation that the method and system of blind spot detection of the present application are applied to a vehicle.
Figure 5B:
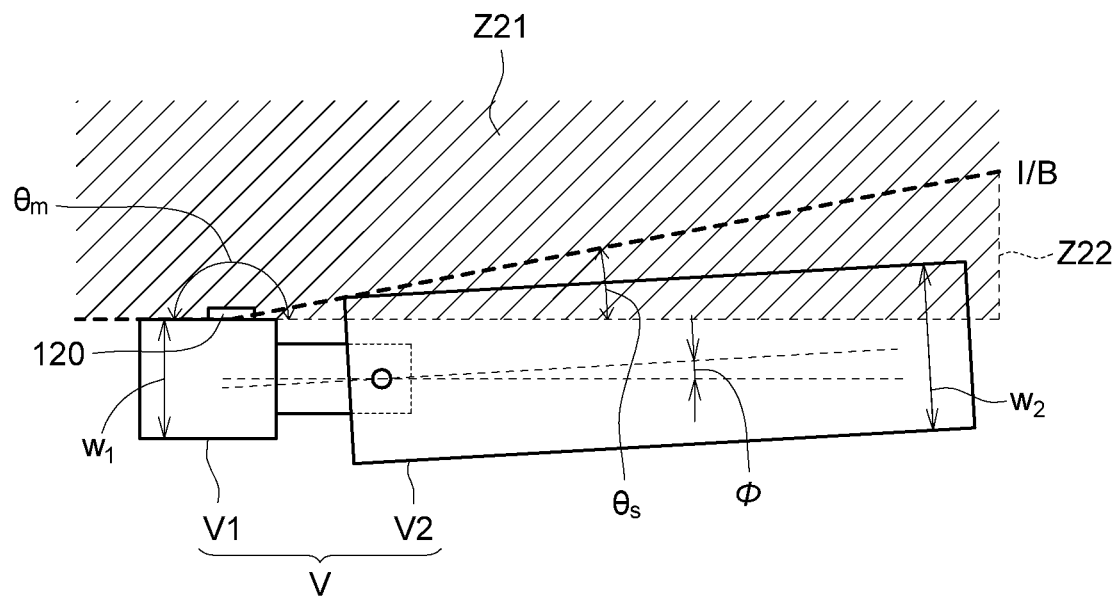
Figure 5C:
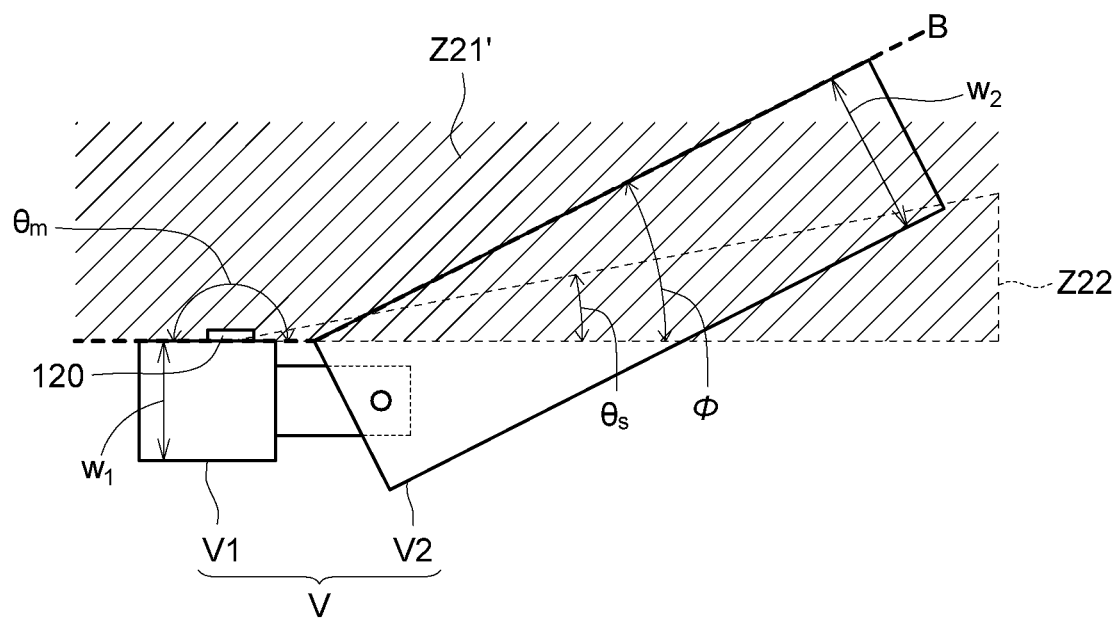
Figure 6A:
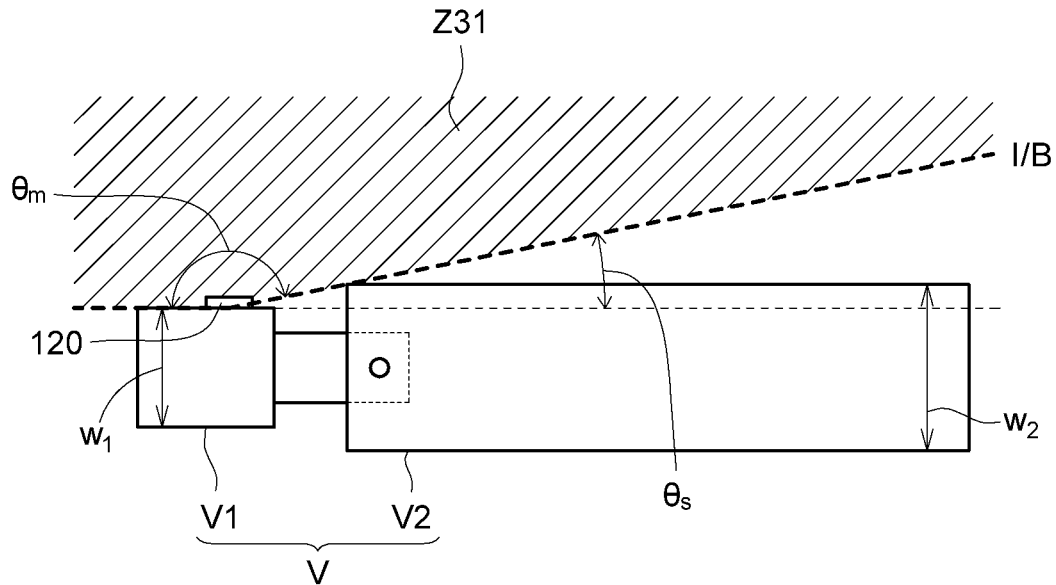
FIGS. 6A to 6C show another situation that the method and system of blind spot detection of the present application are applied to a vehicle.
Figure 6B:
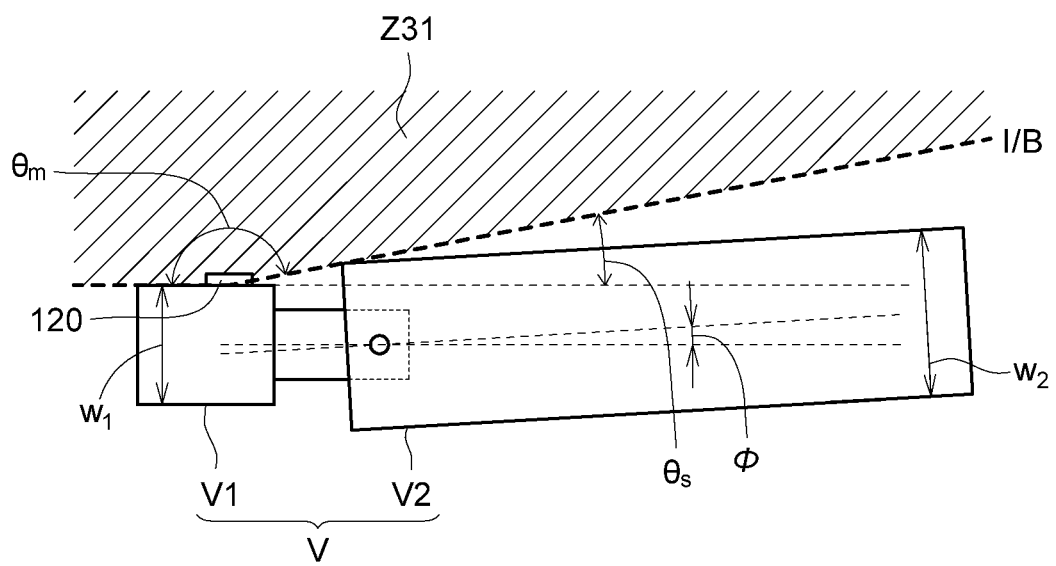
Figure 7A:
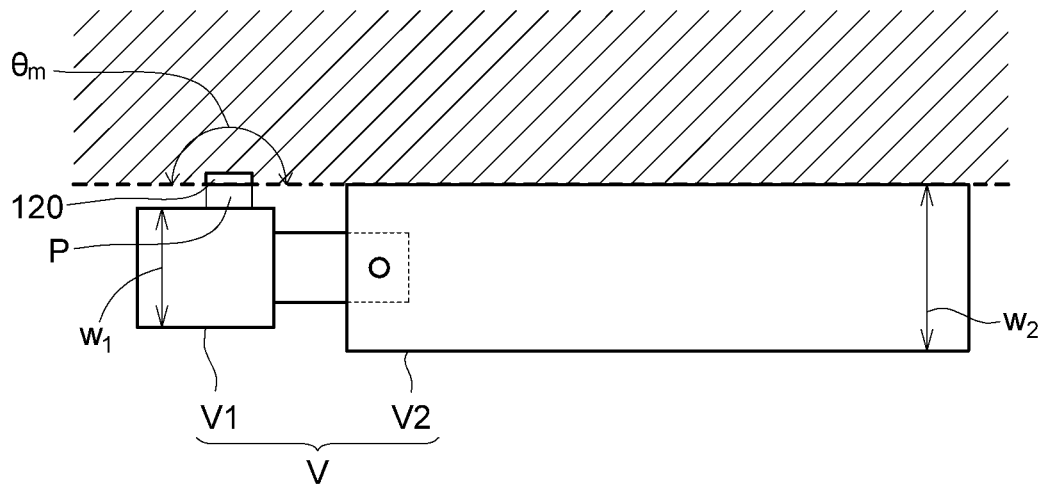
FIGS. 7A to 7B show another situation that the method and system of blind spot detection of the present application are applied to a vehicle.
Figure 7B:
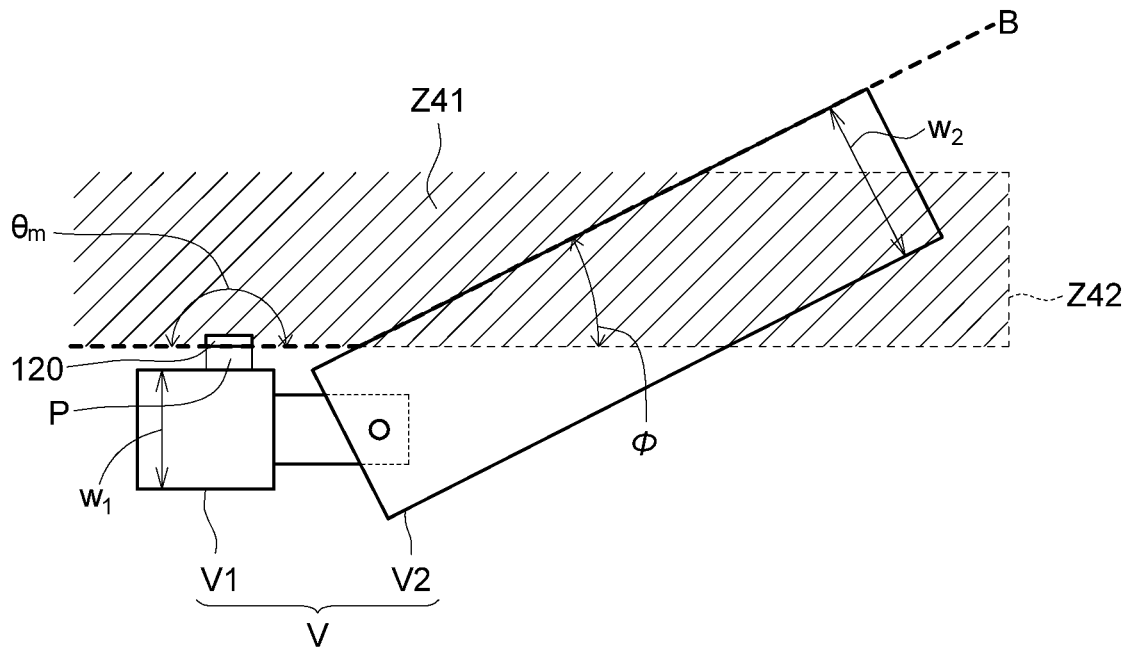

FIG. 4A to FIG. 4B show a situation that the method S and system 100 of blind spot detection of the present application are applied to the vehicle V. FIG. 5A to FIG. 5C show another situation that the method S and system 100 of blind spot detection of the present application are applied to the vehicle V. FIG. 6A to FIG. 6B show another situation that the method S and system 100 of blind spot detection of the present application are applied to the vehicle V. FIG. 7A to FIG. 7B show another situation that the method S and system 100 of blind spot detection of the present application are applied to the vehicle V. The present disclosure takes these four possible situations as examples to describe, but the method and system of blind spot detection of the present application is not limited to only these situations.

In the situation as shown in FIG. 4A to FIG. 4B, the width $W_1$ of the first vehicle body V1 is equal to the width $W_2$ of the second vehicle body V2. The second sensor 120 is arranged on a side of the first vehicle body V1, and no shading angle is formed. The maximum detectable field-of-view $\theta_m$ of the second sensor 120 is preset to 180 degrees. FIG. 4A shows the state that the vehicle V moves in a straight line. In this state, the second sensor 120 does not sense direct reflections reflected from the second vehicle body V2 because no shading angle is formed. Therefore, there is no need to change the sensing range of the second sensor 120. FIG. 4B shows the state that the vehicle V turns (that is, the turning angle Φ is greater than 0 degree). In this state, a part of the second vehicle body V2 is within the maximum detectable field-of-view $\theta_m$ of the second sensor 120, and the sensing range of the second sensor 120 receives direct reflections reflected from the second vehicle body V2, so there is a need to perform filtering for the second sensor 120 to avoid interference with the detection result. Therefore, it is necessary to set the wall boundary of the second vehicle body V2 to be a blind spot detection boundary B for the second sensor 120 by the processor 130 to form a blind spot area Z11, thereby filtering out the reflection signals outside the blind spot area Z11, for example, the reflection signals in the filtered area Z12. By the method as described above, a blind spot area around the vehicle V can be dynamically defined.

In the situation as shown in FIG. 5A to FIG. 5C, the width $W_1$ of the first vehicle body V1 is less than the width $W_2$ of the second vehicle body V2. The second sensor 120 is arranged on a side of the first vehicle body V1, and a shading angle $\theta_s$ is formed (that is, $\theta_s>0$). The maximum detectable field-of-view $\theta_m$ of the second sensor 120 is preset to 180 degrees. FIG. 5A shows the state that the vehicle V moves in a straight line. In this state, a part of the second vehicle body V2 is within the maximum detectable field-of-view $\theta_m$ of the second sensor 120, and the second sensor 120 will continuously sense direct reflections reflected from the second vehicle body V2. Therefore, it is necessary to set an oblique line I extending at the shading angle $\theta_s$ from the second sensor 120 to be the blind spot detection boundary of the second sensor 120 by the processor 130 to form a blind spot area Z21, thereby limiting the sensing range of the second sensor 120 to block the detection of the shading area Z22. FIG. 5B shows the state that the vehicle V turns and the turning angle Φ is less than the shading angle $\theta_s$ (that is, $\Phi<\theta_s$). In this state, since the turning angle Φ is not greater than the shading angle $\theta_s$, the second vehicle body V2 is within the shading area Z22 during the turning process of the vehicle V. As such, there is no interference of reflections caused to the second sensor 120. Therefore, the processor 130 still keeps the oblique line I as the blind spot detection boundary of the second sensor 120 to define the blind spot area Z21. FIG. 5C shows the state that the vehicle V turns and the turning angle Φ is greater than the shading angle $\theta_s$ (that is, $\Phi>\theta_s$). In this state, since the turning angle Φ is greater than the shading angle $\theta_s$, a part of the second vehicle body V2 will move out of the shading area Z22, thereby causing interference of reflections to the second sensor 120. Therefore, it is necessary to set the wall boundary of the second vehicle body V2 as the blind spot detection boundary B of the second sensor 120 to change the blind spot area, thereby filtering out the reflection signal outside the changed blind spot area Z21'. By the method as described above, a blind spot area around the vehicle V can be dynamically defined.

Figure 6C:
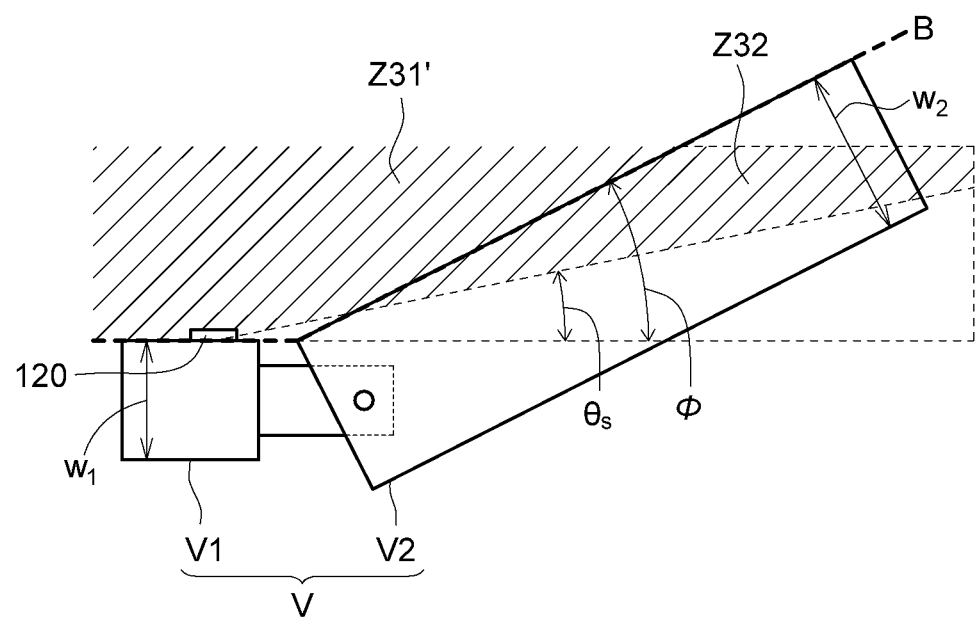

In the situation as shown in FIG. 6A to FIG. 6C, the width $W_1$ of the first vehicle body V1 is less than the width $W_2$ of the second vehicle body V2. The second sensor 120 is arranged on a side of the first vehicle body V1, and a shading angle $\theta_s$ is formed (that is, $\theta_s>0$). The maximum detectable field-of-view $\theta_m$ of the second sensor 120 is preset to be less than 180 degrees, and the blind spot detection boundary B of the second sensor 120 is set to be the oblique line I extending at the shading angle $\theta_s$ to form the blind spot area Z31. FIG. 6A shows the state that the vehicle V moves in a straight line. In this state, since the second vehicle body V2 is outside the range of the maximum detectable field-of-view $\theta_m$ of the second sensor 120, the second sensor 120 does not sense direct reflections reflected from the second vehicle body V2. Therefore, there is no interference of reflections caused to the second sensor 120. FIG. 6B shows the state that the vehicle V turns and the turning angle Φ is less than the shading angle $\theta_s$ (that is, $\Phi<\theta_s$). In this state, since the turning angle Φ is not large, the second vehicle body V2 is still outside the range of the maximum detectable field-of-view $\theta_m$ of the second sensor 120, there is no interference of reflections caused to the second sensor 120. Therefore, the processor 130 still keeps the oblique line I as the blind spot detection boundary B of the second sensor 120 to define the blind spot area Z31. FIG. 6C shows the state that the vehicle V turns and the turning angle Φ is greater than the shading angle $\theta_s$ (that is, $\Phi>\theta_s$). In this state, since the turning angle Φ is greater than the shading angle $\theta_s$, a part of the second vehicle body V2 will move into the preset detectable field-of-view of the second sensor 120, thereby causing interference of reflections to the second sensor 120. Therefore, it is necessary to set the wall boundary of the second vehicle body V2 as the blind spot detection boundary B of the second sensor 120 to redefine the blind spot area, thereby filtering out the reflection signal outside the changed blind spot area Z31', for example, the reflection signals in the filtered area Z32. By the method as described above, a blind spot area around the vehicle V can be dynamically defined.

In the situation as shown in FIG. 7A to FIG. 7B, the width $W_1$ of the first vehicle body V1 is less than the width $W_2$ of the second vehicle body V2. The second sensor 120 is arranged on the first vehicle body V1 through the platform P to be flush with the wall of the second vehicle body V2, and no shading angle is formed. The maximum detectable field-of-view $\theta_m$ of the second sensor 120 is preset to 180 degrees. FIG. 7A shows the state that the vehicle V moves in a straight line. In this state, the second sensor 120 does not receive direct reflections reflected from the second vehicle body V2 because no shading angle is formed. Therefore, there is no need to change the sensing range of the second sensor 120. FIG. 7B shows the state that the vehicle V turns (that is, the turning angle Φ is greater than 0 degree). In this state, a part of the second vehicle body V2 is within the maximum detectable field-of-view $\theta_m$ of the second sensor 120, and the sensing range of the second sensor 120 receives direct reflections reflected from the second vehicle body V2, so there is a need to perform filtering for the second sensor 120 to avoid interference with the detection result. Therefore, it is necessary to set the wall boundary of the second vehicle body V2 to be a blind spot detection boundary B for the second sensor 120 by the processor 130 to form a blind spot area Z41, thereby filtering out the reflection signals outside the blind spot area Z41, for example, the reflection signals in the filtered area Z42. By the method as described above, a blind spot area around the vehicle V can be dynamically defined.

Figure 8:
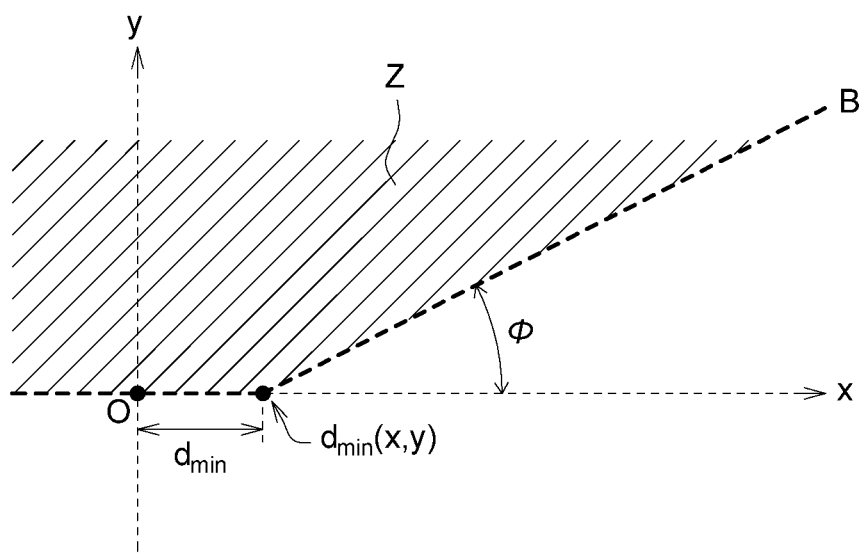
FIG. 8 shows a blind spot area defined by the method of blind spot detection of the present application.

FIG. 8 shows the blind spot area defined by the method and system of blind spot detection of the present application. Take the position of the half width of the front end of the first vehicle body V1 as a reference point O. Then, the blind spot area of the present application is defined as the following inequality (1) for the blind spot detection boundary B:

$$y \leq \tan(\Phi) \times [x - d_{min}(x)] + d_{min}(y) \quad (1)$$

Wherein $d_{min}$ represents the minimum value (that is, the shortest distance) between the second sensor 120 and the second vehicle body V2, $d_{min}(x, y)$ is the position coordinate of the shortest distance $d_{min}$ between the second sensor 120 and the second vehicle body V2, $d_{min}(x)$ represents the X coordinate value of the position coordinate $d_{min}(x, y)$ relative to the reference point O, and $d_{min}(y)$ represents the Y coordinate value of the position coordinate $d_{min}(x, y)$ relative to the reference point O. The turning angle $\Phi$ is the turning angle information that can be obtained by an angle sensor (for example, the first sensor 110) on the vehicle V during the moving of the vehicle V. Therefore, if the turning angle $\Phi$ and the position coordinate $d_{min}(x, y)$ are determined, the inequality (1) for blind spot detection boundary B above can be established.

Therefore, the processor 130 receives a position of the object approaching the vehicle body V reported by the second sensor 120, converts the position into a coordinate (x, y) relative to the reference point O, and substitutes the coordinate (x, y) into the inequality (1) to determine whether the inequality (1) is satisfied. If the inequality (1) is satisfied, it means that the object is not located in the blind spot area Z of the present disclosure, and the object is the interference of detection result and so needs to be filtered. Conversely, if the inequality (1) is not satisfied, it means that the object is located in the blind spot area Z of the present disclosure, and a warning step like the aforementioned step S14 should be subsequently performed. Therefore, the blind spot detection boundary B can improve the deficiency of the radar sensor (that is, the deficiency is that the radar sensor cannot effectively distinguish an actual reflection from a virtual reflection). As such, the detection of the blind spot area can be more precise.

In conclusion, the present disclosure describes a method and system of blind spot detection that can be used for vehicles, by referring both the dynamic information (such as the turning angle information) and the static information (such as the predetermined information related to the vehicle and/or sensors) to dynamically define a blind spot area around the vehicle so as to make the detection result of the sensor more precise, thereby enhancing the performance of blind spot detection.

While the application has been described and illustrated with reference to specific embodiments thereof, these descriptions and illustrations do not limit the application. It should be understood by those skilled in the art that various changes may be made and equivalents may be substituted without departing from the true spirit and scope of the application as defined by the appended claims. The illustrations may not necessarily be drawn to scale. There may be distinctions between the artistic renditions in the present disclosure and the actual apparatus due to manufacturing processes and tolerances. There may be other embodiments of the present application which are not specifically illustrated. The specification and the drawings are to be regarded as illustrative rather than restrictive. Modifications may be made to adapt a particular situation, material, composition of matter, method, or process to the objective, spirit and scope of the application. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the application. Accordingly, unless specifically indicated herein, the order and grouping of the operations are not limitations of the application.

What is claimed is:

1. A method of blind spot detection for a vehicle, wherein the vehicle includes a first vehicle body and a second vehicle body dragged by the first vehicle body, the method of blind spot detection comprising:
   obtaining a turning angle information of the second vehicle body relative to the first vehicle body by a first sensor while the vehicle is moving;
   determining a predetermined information related to the vehicle and a second sensor wherein the step of determining the predetermined information related to the vehicle and the second sensor comprises:
      determining a coordinate where the second sensor is installed on the first vehicle body;
   dynamically defining a blind spot area around the vehicle according to the turning angle information and the predetermined information; and
   receiving a sensing signal regarding an object around the vehicle from the second sensor to determine whether the object is located in the blind spot area.

2. The method of blind spot detection according to claim 1, further comprising:
   activating a warning device in response to determining the object is located in the blind spot area.

3. The method of blind spot detection according to claim 1, wherein the step of determining the predetermined information related to the vehicle and the second sensor comprises:
   determining a dimension information about the first vehicle body and the second vehicle body.

4. The method of blind spot detection according to claim 3, wherein the dimension information is about a width of the first vehicle body and a width of the second vehicle body, and in response to that the width of the first vehicle body is less than the width of the second vehicle body, the predetermined information further includes a shading angle information formed by the second vehicle body shielding the second sensor.

5. The method of blind spot detection according to claim 1, wherein the step of determining the predetermined information related to the vehicle and the second sensor comprises:
   determining a sensing performance information about the second sensor.

6. The method of blind spot detection according to claim 5, wherein the sensing performance information is a maximum detectable field-of-view of the second sensor.

7. The method of blind spot detection according to claim 1, wherein the step of determining the predetermined information related to the vehicle and the second sensor comprises:
   determining a dimension information about the first vehicle body and the second vehicle body; and
   determining a sensing performance information about the second sensor.

8. The method of blind spot detection according to claim 7, wherein the dimension information is about a width of the first vehicle body and a width of the second vehicle body, and when the second sensor is determined to be installed on the first vehicle body and the width of the first vehicle body is determined to be less than the width of the second vehicle body, the method of blind spot detection further comprises:
determining a shading angle information formed by the second vehicle body shielding the second sensor; and
dynamically defining the blind spot area according to the turning angle information, the dimension information, the location information, the sensing performance information and the shading angle information.

9. A system of blind spot detection for a vehicle, wherein the vehicle includes a first vehicle body and a second vehicle body dragged by the first vehicle body, the system of blind spot detection comprising:
a first sensor configured to obtain a turning angle information of the second vehicle body relative to the first vehicle body while the vehicle is moving;
a second sensor configured to sense an object approaching the vehicle; and
a processor communicating with the first sensor and the second sensor and configured to determine a predetermined information related to the vehicle and a second sensor, dynamically define a blind spot area around the vehicle according to the turning angle information and the predetermined information, and receive a sensing signal regarding the object from the second sensor to determine whether the object is located in the blind spot area,
wherein the determining the predetermined information related to the vehicle and the second sensor by the processor comprises determining a coordinate where the second sensor is installed on the first vehicle body.

10. The system of blind spot detection according to claim 9, wherein the processor activates a warning device in response to that the processor determines that the object is located in the blind spot area.

11. The system of blind spot detection according to claim 9, wherein the determining the predetermined information related to the vehicle and the second sensor by the processor comprises determining a dimension information about the first vehicle body and the second vehicle body.

12. The system of blind spot detection according to claim 11, wherein the dimension information is about a width of the first vehicle body and a width of the second vehicle body, and in response to that the width of the first vehicle body is less than the width of the second vehicle body, the processor further determines a shading angle information formed by the second vehicle body shielding the second sensor.

13. The system of blind spot detection according to claim 9, wherein the determining the predetermined information related to the vehicle and the second sensor by the processor comprises determining a sensing performance information about the second sensor.

14. The system of blind spot detection according to claim 13, wherein the sensing performance information is a maximum detectable field-of-view of the second sensor.

15. The system of blind spot detection according to claim 9, wherein the determining the predetermined information related to the vehicle and the second sensor by the processor comprises determining a dimension information about the first vehicle body and the second vehicle body and determining a sensing performance information about the second sensor.

16. The system of blind spot detection according to claim 15, wherein the dimension information is about a width of the first vehicle body and a width of the second vehicle body, and when the processor determines that the second sensor is installed on the first vehicle body and the processor determines that the width of the first vehicle body is less than the width of the second vehicle body, the processor further determines a shading angle information formed by the second vehicle body shielding the second sensor, and dynamically defines the blind spot area according to the turning angle information, the dimension information, the location information, the sensing performance information and the shading angle information.

* * * * *